April 27, 1937. T. C. PEW 2,078,456
ANTIFRICTION BEARING
Filed June 23, 1936 2 Sheets-Sheet 1

INVENTOR.
Thomas C. Pew
BY Barnes, Kisselle, Laughlin & Raisch
ATTORNEY.

April 27, 1937.    T. C. PEW    2,078,456
ANTIFRICTION BEARING
Filed June 23, 1936    2 Sheets-Sheet 2

INVENTOR.
Thomas C. Pew
BY Barnes, Kisselle, Laughlin & Raisch
ATTORNEY.

Patented Apr. 27, 1937

2,078,456

UNITED STATES PATENT OFFICE 2,078,456

ANTIFRICTION BEARING

Thomas C. Pew, Ann Arbor, Mich., assignor to Hoover Steel Ball Company, Ann Arbor, Mich., a corporation of Michigan Application June 23, 1936, Serial No. 86,829

8 Claims. (Cl. 308—201)

This invention relates to antifriction bearings, and has to do particularly with a retainer or cage for the antifriction elements of such bearings.

Bearings of the type referred to usually include inner and outer raceway members with rolling antifriction elements therebetween. Of course, one raceway member such as the inner one, for example, may be a shaft. The antifriction elements are retained and held arcuately located in proper spaced relation by means of a retainer or cage, and the present invention has to do with this portion of an antifriction bearing.

Where the antifriction elements are in the form of balls it has heretofore been proposed to employ a cage made up of two opposed sheet metal stampings with alternate semi-circular portions and abutting portions, with the semi-circular portions matching to receive the balls and with the abutting portions coming together. It has been proposed to rivet the abutting portions of the two stampings together. The use of rivets is objectionable as there are a number of rivets to each bearing and they have to be handled with care, and which difficulty is increased in bearings of small sizes. Moreover, the retainer halves must be very accurately located with the result that extremely close tolerances for the rivets and the rivet holes must be maintained, and this makes the rivets hard to insert; once inserted they are liable to fall out of position before being riveted in position. It has also been proposed to provide the retainer halves with integral wings or the like arranged to be fashioned over a portion of the opposite cage half, or with the wings folded together to form a joint, but the structures heretofore proposed along this line have not been satisfactory and require high cost die equipment and result in a considerable metal wastage.

The present invention aims to provide an improved retainer made up of two retainer halves with integral parts fashioned to project therefrom and arranged to pass through receiving apertures in the opposite retainer half, and then fashioned, peened or riveted over. The structure of the present invention is one simple in construction and one which materially facilitates manufacture without waste of material and in which all die operations are performed in a direction axially of the bearing, the pertinence of which will presently appear.

Figure 1:
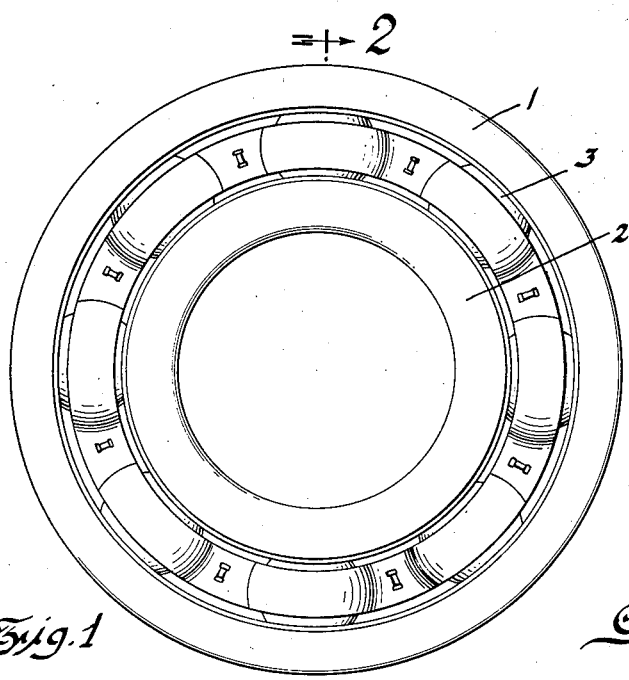
Fig. 1 is a side elevational view of a complete bearing constructed in accordance with the invention.
Figure 2:
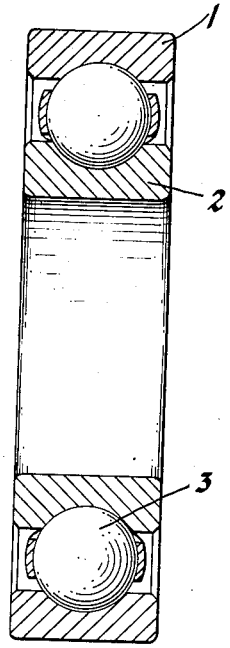
Fig. 2 is a cross sectional view taken substantially on line 2—2 of Fig. 1.
Figure 3:
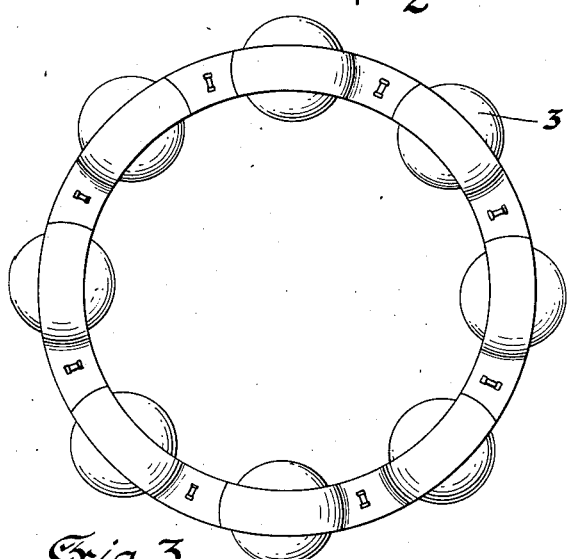
Fig. 3 is a side view of a retainer with the balls therein.

As shown in Fig. 1 the outer race of a bearing is shown at 1 and the inner race at 2. These members have raceways as shown in Fig. 2. A plurality of antifriction elements, here shown as being in the form of balls, are disposed between the inner and outer races, the ball elements being illustrated at 3.

Figure 4:
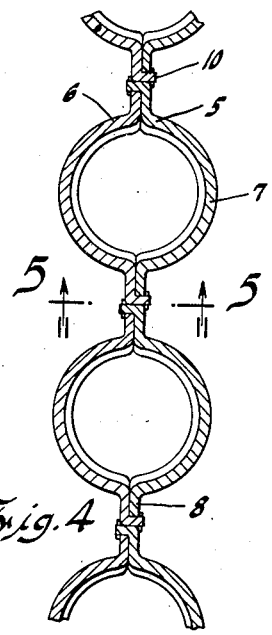
Fig. 4 is a developed cross sectional view taken through the retainer.
Figure 5:
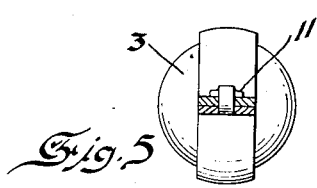
Fig. 5 is a cross sectional view taken substantially on line 5—5 of Fig. 4.

The retainer takes the form of two similar members advantageously formed from stampings of sheet metal, one retainer half being generally indicated at 5 and the other at 6. These retainer halves may be identical and merely placed in reverse position and fitted together as shown in Fig. 4. The stamping is so formed as to provide the retainer with alternate circular-like retainer portions 7 provided by two matching semi-circular parts, and abutting portions 8. Each abutting portion has a lug 10 struck from the metal thereof so as to lie in a position substantially at right angles to the abutting portions and this lug 10, when struck out from the metal, leaves an aperture. When the two rings are fitted together, as shown in Fig. 4, the lug 10 on one retainer half fits through the aperture in the other, as shown. Thus the lugs 10 in abutting portions 8 lie flush against each other and each is tightly received in its aperture. As a matter of fact the arrangement is preferably such that some pressure is required to assemble the two retainer halves in position, with the lugs penetrating through the apertures. After the assembly is thus completed the metal at the end of the lugs is peened or riveted over as shown at 11 (Fig. 5), so that the two retainer halves are securely united.

In making the assembly the parts are assembled in the races as shown in Fig. 1, and then the lugs are subjected to the peening or riveting action. It will be observed that this action is accomplished by applying pressure in an axial direction. As a result a relatively simple mechanism embodying dies or punches may be used. This is pointed out to distinguish from an operation where wings or the like which may be on the retainer halves have to be folded over laterally, as such an operation is materially interfered with by the inner and outer races and requires more elaborate mechanism. The metal is riveted down tightly so that abutting portions 8 are drawn tightly together and held tightly together and there is no springing back of the metal once the lugs are riveted. Furthermore, it will be noted that the position of the lugs 10 is such that they abut snugly against each other, and each fits tightly in its aperture so that the semi-circular portions are held on center to properly fit the balls therein. The riveting operation sets up no relative rotary movement between the retainer halves which would tend to shift the retainer halves and cause the semi-circular portions to become eccentrically positioned relative to each other. This structure is advantageously for use in all sizes of bearings and is particularly advantageous in small sizes, as it eliminates the difficulty and sometimes almost unfeasible practice of using separate rivets.

Figure 6:
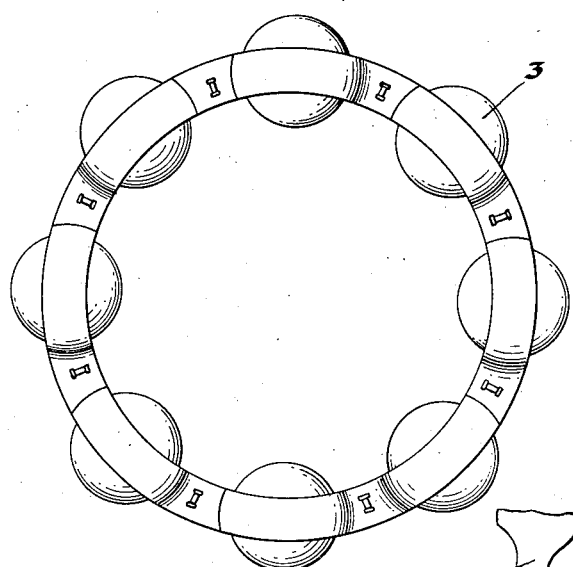
Fig. 6 is a view of a retainer with balls therein illustrating a modified form of the invention.
Figure 7:
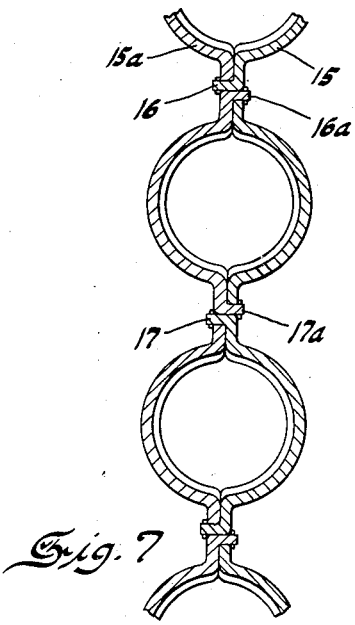
Fig. 7 is a developed cross sectional view taken through the retainer shown in Fig. 6.

A modified form is shown in Figs. 6 and 7, Fig. 6 showing the ball and retainer assembly without the races. This form differs from the form previously described, in this: The retainer halves previously described have the lugs 10 struck out in identical manners, with the result that the two retainer halves may be fitted together in any position in which they happen to come, while the retainer halves of Figs. 6 and 7 will only fit in alternate positions. The retainer half 15 (Fig. 7) has lugs 16 projecting therefrom and lugs 17 which are alternately arranged and alternately positioned. The other retainer 15a is the same with similar alternating lugs 16a and 17a. Viewing Fig. 7 the lugs 16 are struck out of the metal leaving an opening below it, while a lug 17 is struck out leaving an opening above it. In putting the two retainer halves together lugs 16 and 16a must be located in proximity and lugs 17 and 17a must be located in proximity, since either the lug 16 or 16a will not properly fit with lugs 17 or 17a respectively. The ends of the lugs are peened over in the same manner as that heretofore described. However, these lugs back up against each other and likewise fit tightly in their openings so that the ball retaining portions are held on center.

Figure 8:
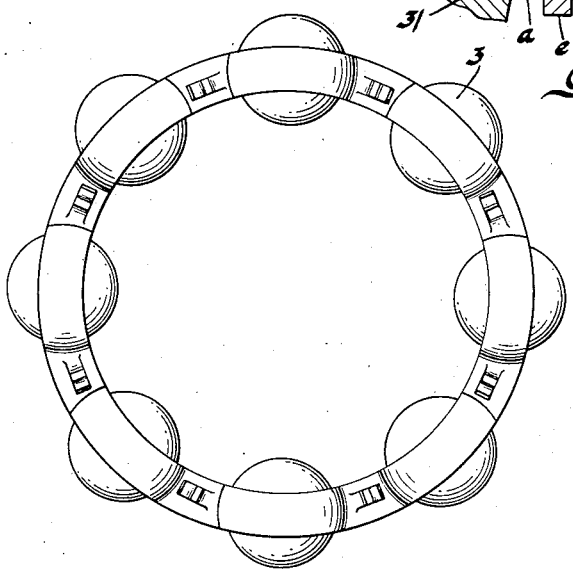
Fig. 8 is a side elevational view of a retainer with balls therein of a further modified form.
Figure 9:
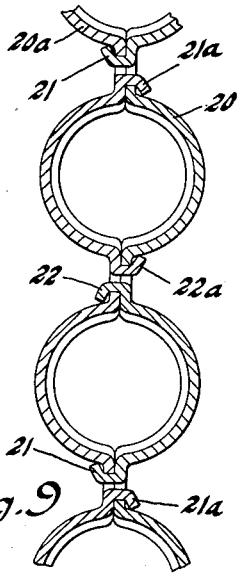
Fig. 9 is a developed cross sectional view taken through the retainer of Fig. 8.

In the form shown in Figs. 8 and 9 a structure is provided wherein, instead of a riveting or peening action, metal parts are fashioned over with a fold formation. Here again the retainer halves are identical. The retainer half 20 has wings or lugs 21 and alternate wings or lugs 22. The similar retainer half 20a has lugs 21a and alternate lugs 22a. It will be noted that the lugs 21 and 22 fold in opposite directions as do also 21a and 22a. The lugs fit through openings formed by the provision of the struck out lugs or wings on the other retainer half. As a result these two retainer halves fit together only in alternate positions as the lugs 21 and 21a must lie together, and lugs 22 and 22a must lie together. In other words, the lug 21 on the retainer half 20 will not cooperate with lug 22a.

Now it will be noted that when these retainer halves are placed together for assembly that the lugs are passed through their respective apertures and bent or fashioned over with a clamping action. As a result one lug sets up a force tending to shift the retainer halves rotatably relative to each other, and this would, except for other provisions, cause the bearing retainer portions to become off center. However, by making the alternate lugs 21 and 22 extend in alternate directions so as to be folded and clamped in alternate directions, as well also as the provision of the alternate direction of folding the lugs 21a and 22a, the forces are neutralized so that there is no tendency to displace the retainer halves rotatable relative to each other.

In all the forms shown herein, it is to be noted that the final operation and assembly of riveting or fashioning over metal parts may be accomplished by operations where force is applied axially of an assembled bearing. The inner and outer periphery of the retainer halves as shown in Figs. 1, 3, 6 and 8 are not provided with wings or projections, with the result that there is practically no metal wastage. Where the retainer halves are fashioned out of sheet metal stock there is a blank of metal left at the interior, but this may be used for other smaller retainers. Likewise larger retainers may be stamped out of the larger stock after the smaller retainers have been removed therefrom. If the retainer halves were provided with radially extending wings or lugs, that is to say, portions integral with the retainer halves and extending toward the center or toward the outside from the inner and outer periphery of the retainer, the left over metal would be notched and wasted. The present retainer is formed by clean circular cuts and the remaining stock may then be used for retainers of different sizes or other parts.

Figure 10:
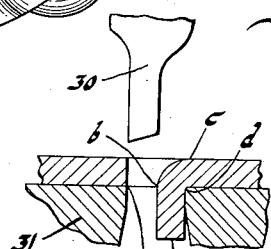
Fig. 10 is a cross sectional view illustrating diagrammatically how the lugs may be formed.

It will be noted that there is a peculiarity in the forms of the invention shown in Figs. 1 to 5 inclusive and 6 and 7, in this, that the lugs which are punched out of the metal have a length greater than the width of the aperture left by the punched out metal, measuring the aperture in a direction perpendicular to the lug. This may be explained in connection with the diagrammatical view in Fig. 10. In this view the punch is shown at 30, and the die at 31. In order to have an aperture with a width $a$—$b$, the stock on the punch side starts to bend at a point removed from the aperture, as for example at $c$, while the wall of the die along which the lug is bent is backed away from the apertured location a distance substantially equal to the width of the stock as illustrated at $d$. Thus the distance $a$—$d$ is approximately twice the width of the aperture. The metal on the outer radius of the bend line is stretched while the metal on the inside of the radius is compressed. This tends to shorten the lug, with the result that the distance from $d$ to $e$, is less than $a$ to $d$, but greater than the thickness of the stock and greater than the distance from $a$ to $b$. In practice it has been found that the distance from $d$ to $e$ is approximately three-fourths of the distance from $a$ to $d$; thus the lug has a length greater than the aperture left thereby, and accordingly similar lugs may be press fitted into the apertures and still extend through the stock a sufficient distance for riveting. Of course, the ratio of the width of the opening relative to the height of the lug depends upon stock thickness and the sizes of the apertures and lugs, etc.

When the lugs are press fitted into position, the riveting operation does not cause the metal thereof to spread in between the retainer halves so that the retainer halves are held properly located. If the metal of the lugs are not tightly held in the apertures then the metal will tend to spread and the retainers may either be forced apart axially or shifted relative to each other rotatably. In all the forms herein the stampings may be identical and merely reversed, for assembly. And the tight or press fitting of the lugs shown in Figs. 1 to 7 inclusive prevent relative rotational shift of the retainer halves, while the alternate arrangement in Figs. 8 and 9 set up opposing forces which balance out and prevent relative rotational shift of the retainer halves.

I claim:

1. A retainer for rolling elements of an antifriction bearing comprising, two retainer halves of the same structure, each having alternate abutment portions and holding portions and arranged to fit together with the abutment portions lying against each other and with the holding portions aligned to receive and hold the rolling elements, each abutment portion of each retainer half having a part struck out therefrom to provide a lug and to leave an aperture, the lugs on one retainer half being positioned in the apertures of the other retainer half and the end parts of the lugs being fashioned over to unite the retainer halves.

2. A retainer for rolling elements of an antifriction bearing comprising, two retainer halves of the same structure, each having alternate abutment portions and holding portions and arranged to fit together with the abutment portions lying against each other and with the holding portions aligned to receive and hold the rolling elements, each abutment portion of each retainer half having a portion struck out therefrom to provide a lug extending in a direction substantially perpendicular to the radial plane of the retainer and each abutment portion having an aperture provided by the struck out lug, the lugs of one retainer half passing through the apertures of the other retainer half and the end portions of the lugs being fashioned over to unite the retainer halves.

3. A retainer for rolling elements of an antifriction bearing comprising, two retainer halves of the same structure, each having alternate abutment portions and holding portions and arranged to fit together with the abutment portions lying against each other and with the holding portions aligned to receive and hold the rolling elements, each abutment portion of each retainer half having a portion struck out therefrom to provide a lug and having an aperture provided by the struck out lug, the lugs on one retainer half passing through the apertures in the other retainer half with the lugs lying next adjacent each other and the end portions of the lugs being fashioned over to secure the retainer halves together.

4. A retainer for rolling elements of an antifriction bearing comprising, two identical retainer halves, each having alternate abutment portions and holding portions, said retainer halves being reversed relative to each other and placed together with the abutment portions lying against each other and with the holding portions designed to receive and hold rolling elements, each abutment portion of each retainer half having a lug struck out therefrom leaving an aperture, the lugs of one retainer half passing through the apertures of the other retainer half and the end parts of the lugs being fashioned over to secure the retainer halves together.

5. A retainer for rolling elements of an antifriction bearing comprising, two retainer halves of the same structure, each having alternate abutment portions and holding portions and arranged to fit together with the abutment portions lying against each other and with the holding portions aligned to receive and hold the rolling elements, each abutment portion of each retainer half having a lug struck therefrom to leave an aperture, and all of said lugs and apertures of the abutment portions being similarly relatively located, the lugs on one retainer half being located in the apertures of the other retainer half with said lugs being positioned flush against each other, and the ends of the lugs being riveted over to secure the retainer halves together.

6. A retainer for rolling elements of an antifriction bearing comprising, two retainer halves of the same structure, each having alternate abutment portions and holding portions and arranged to fit together with the abutment portions lying against each other and with the holding portions aligned to receive and hold the rolling elements, each abutment portion of each retainer half having a lug struck therefrom to leave an aperture, and all of said lugs and apertures of the abutment portions being similarly relatively located, the lugs on one retainer half being located in the apertures of the other retainer half with said lugs being positioned flush against each other and press fitted into the apertures, and the ends of the lugs being riveted over to secure the retainer halves together.

7. A retainer for rolling elements of an antifriction bearing comprising, two retainer halves of the same structure, each having alternate abutment portions and holding portions and arranged to fit together with the abutment portions lying against each other and with the holding portions aligned to receive and hold the rolling elements, each abutment portion of each retainer half having a lug struck out therefrom, thereby leaving an aperture, alternate lugs on each retainer half being struck out in opposite directions whereby alternate abutment portions have lugs and apertures reversed relative to each other, said retainer halves being reversed as to position and placed together with the lugs on one extending through apertures in the other and with the lugs abutting each other, the ends of the lugs being riveted over to secure the retainer halves together.

8. A retainer for rolling elements of an antifriction bearing comprising, two retainer halves of the same structure, each having alternate abutment portions and holding portions and arranged to fit together with the abutment portions lying against each other and with the holding portions aligned to receive and hold the rolling elements, each abutment portion of each retainer half having a portion struck out therefrom to provide an extension and to leave an aperture, alternate extensions being struck out in opposite directions whereby alternate lugs and apertures of alternate abutment portions are reversed relative to each other, the retainer halves being placed face to face with the abutment portions lying against each other and with the extensions of one retainer half extending through the apertures in the other, said extensions being fashioned over to lock the retainer halves together, and alternate extensions on each retainer half being fashioned over in opposite directions.

THOMAS C. PEW.